US012645195B2

(12) United States Patent
Burgert et al.

(10) Patent No.: US 12,645,195 B2
(45) Date of Patent: Jun. 2, 2026

(54) METHOD FOR GENERATING A TWIN SENSOR BY WAY OF PARAMETER INHERITANCE

(71) Applicant: VEGA Grieshaber KG, Wolfach (DE)

(72) Inventors: Florian Burgert, Gengenbach (DE); Tom Mulvey, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 616 days.

(21) Appl. No.: 18/168,966

(22) Filed: Feb. 14, 2023

(65) Prior Publication Data

US 2023/0259096 A1 Aug. 17, 2023

(30) Foreign Application Priority Data

Feb. 14, 2022 (EP) .................................... 22156621

(51) Int. Cl.
| | |
|---|---|
| *G06F 9/445* | (2018.01) |
| *G05B 19/406* | (2006.01) |
| *G06F 8/30* | (2018.01) |
| *G06F 8/61* | (2018.01) |
| *G06F 9/4401* | (2018.01) |
| *G06F 40/126* | (2020.01) |
| *H04L 67/00* | (2022.01) |

(52) U.S. Cl.
CPC ....... *G05B 19/406* (2013.01); *G06F 9/44505* (2013.01); *G05B 2219/32181* (2013.01)

(58) Field of Classification Search
CPC ...... G06F 8/30; G06F 9/44505; G06F 9/4411; G06F 8/63; G05B 19/406; G05B 2219/32181; H04L 67/125; H04L 67/34

USPC ............................................................ 710/8
See application file for complete search history.

(56) References Cited

U.S. PATENT DOCUMENTS

| | | | | |
|---|---|---|---|---|
| 2014/0122855 A1* | 5/2014 | Maneval | ........... | G05B 19/0426 713/1 |
| 2015/0054621 A1 | 2/2015 | Lin et al. | | |
| 2018/0035374 A1* | 2/2018 | Borden | ............. | H04W 28/0278 |
| 2019/0011890 A1 | 1/2019 | Schmidt | | |
| 2019/0363933 A1* | 11/2019 | Morley | ................. | H04W 24/02 |
| 2021/0165383 A1* | 6/2021 | Garcia | ............... | G05B 19/0426 |

FOREIGN PATENT DOCUMENTS

| | | |
|---|---|---|
| DE | 10 2018 221 071 A1 | 6/2020 |
| WO | WO 2019/208630 A1 | 10/2019 |
| WO | WO 2021/002281 A1 | 1/2021 |

* cited by examiner

*Primary Examiner* — Chun Kuan Lee
(74) *Attorney, Agent, or Firm* — Oblon, McClelland, Maier & Neustadt, L.L.P.

(57) ABSTRACT

A method for generating a twin sensor by parameter inheritance, the twin sensor being suitable for substituting a sensor including coupling a mobile terminal to the sensor to transmit signals, configuring the sensor by way of the mobile terminal, wherein the configuring is based on configuration parameters transmitted to the sensor by way of the mobile terminal, generating a one-to-one generation code for inheriting the parameters by way of a configuration module, based on the configuration parameters, and providing the generation code by the configuration module, for generating the twin sensor by way of inheriting the parameters, wherein the inheriting of the parameters is based on the generation code.

20 Claims, 1 Drawing Sheet

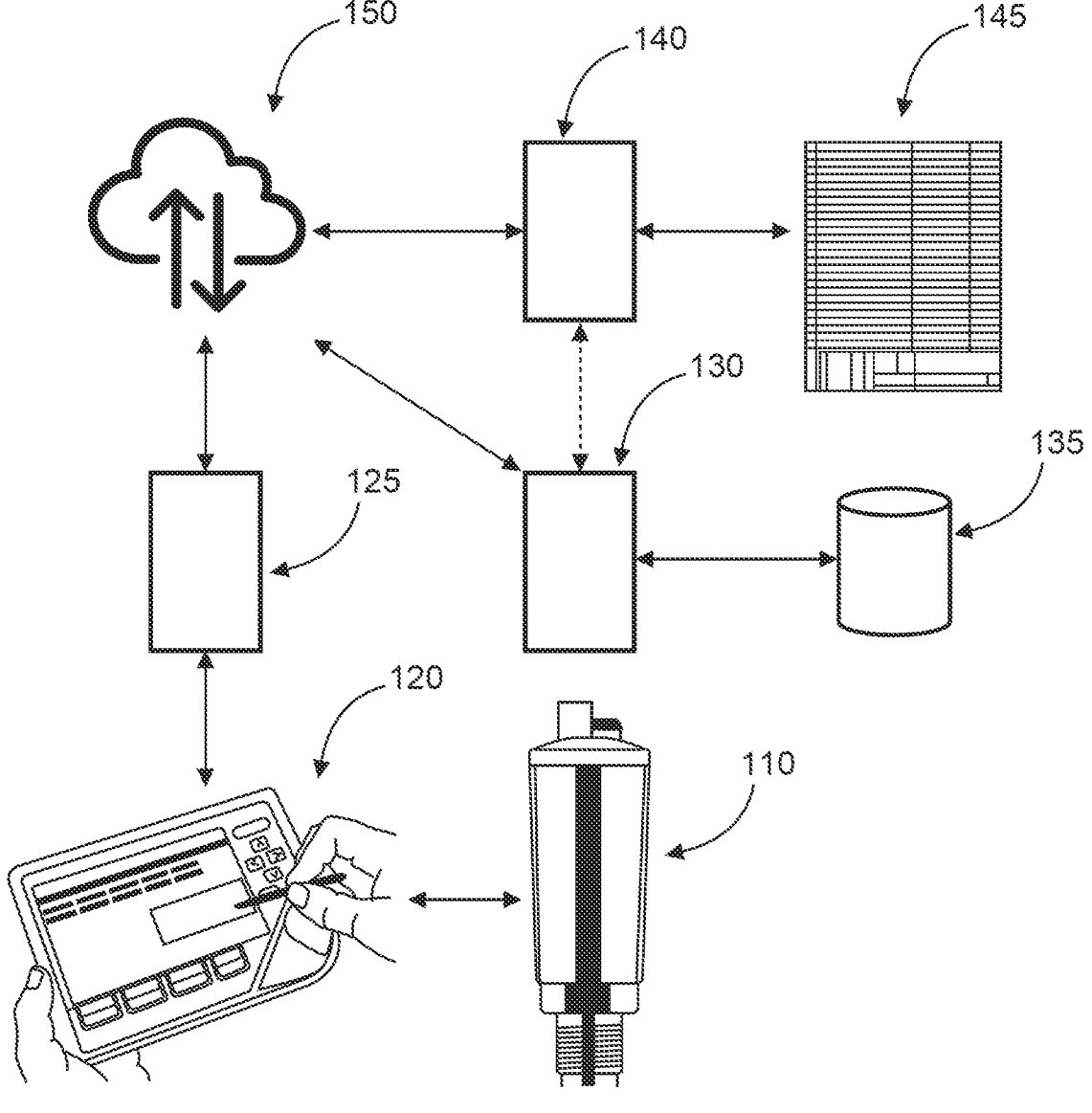

METHOD FOR GENERATING A TWIN SENSOR BY WAY OF PARAMETER INHERITANCE

CROSS-REFERENCE TO RELATED APPLICATIONS

This application claims the benefit of the filing date of European Patent Application No. 22 156 621.9 filed on 14 Feb. 2022, the entire content of which is incorporated herein by reference.

BACKGROUND

Manufacturing processes in the processing industry include the processing of raw materials, such as mixing, heating, etc. Batch processes structure production processes into batches and are usually specified in the form of a recipe that documents the steps of performing processes using the plant equipment. These production processes are usually monitored using industrial sensors that determine process characteristics such as pressure or flow rate.

SUMMARY

Since the corresponding industrial sensors are particularly relevant to effective run production processes, it should be possible to substitute them quickly and easily in the event of a defect or as a precautionary measure or in accordance with a maintenance interval.

The variety of sensors provided in terms of mechanical, functional, and configurable characteristics renders it desirable to easily identify and configure specific sensors used in a production facility in order to provide a replacement sensor.

According to aspects of the disclosure, a method for generating a twin sensor by way of parameter inheritance, a sensor, a mobile terminal and a system for generating a twin sensor according to the features of the independent claims are provided. Advantageous embodiments are the subject of the dependent claims and the following description.

In this entire description, the sequence of method steps is shown in such a way that the method can be easily understood. However, the person skilled in the art will recognize that many of the process steps can also be performed in a different sequence and lead to the same or a corresponding result. In this sense, the order of the process steps can be changed accordingly. Some features are provided with counting words to improve readability or to make the assignment more clear, but this does not imply a presence of certain features.

According to an aspect of the disclosure, a method for generating a twin sensor using parameter inheritance is described, wherein the twin sensor is suitable for substituting a sensor. This method comprises the following steps: In one step, a mobile terminal is coupled to the sensor to transmit signals. In another step, the sensor is configured by way of the mobile terminal, the configuring being based on configuration parameters transmitted to the sensor by way of the mobile terminal. In a further step, a unique generation code or a one-to-one generation code for inheriting the configuration parameters is generated by way of a configuration module, based on the configuration parameters. In a further step, the generation code is provided by the configuration module, for generating the twin sensor by way of inheriting the parameters, where the inheriting of the parameters is based on the generation code.

According to one aspect, the sensor may be a put-in-service sensor or a tested sensor that has both mechanical and functional features for a particular function and has been specifically configured to operate the sensor.

The one-to-one generation code can correspond to an ordering number or a part number or a purchase number, which characterizes a one-to-one or unique specification of a device, such as in particular a sensor, including all device-specific properties or features of a mechanical and electrical kind, as well as the corresponding parameterization needed to run a software, for example. Advantageously, this generation code, in contrast to a HASH code, which is usually very long, such as e.g., 126 characters, can be described in a human-readable code corresponding to an ordering number or a catalog number via an online connection with one or more servers.

Advantageously, using this method, a customer does not have to manually transfer settings of his sensor, which have been made, for example, during a start-up of the sensor, to a manufacturer of the twin sensor.

When a customer has installed his device, such as the sensor, in a production plant and has performed a start-up, according to his requirements, all configuration parameters are defined.

The customer can then use a mobile terminal, i.e., an operating tool, such as a smartphone with a corresponding APP to transfer the configuration parameters and/or the one-to-one generation code between the sensor or twin sensor and the mobile terminal. Such a transmission can be done using a wireless connection, e.g., for a transmission in a closer environment with Bluetooth methods or for a transmission over a longer distance with a LoRa method or alternatively with a wired connection or with Pactware DTM.

For this purpose, the mobile terminal can establish a connection to a configuration server and can either transmit the one-to-one generation code generated by way of the sensor for generating a twin sensor to the configuration server, or transmit corresponding mechanical and electrical features as well as the configuration parameters for a software of the device as configured to the configuration server, which uses these data to generate a one-to-one generation code for generating a twin sensor. Alternatively or additionally, the customer can also use this generation code for a manual order of a twin sensor of the sensor set in operation.

Advantageously, this method provides a customer with an identical device, respectively like device, or an identical twin sensor, which is suitable for substituting the sensor that has been put into operation. In particular, the twin sensor advantageously comprises the corresponding configuration parameters so that it can be directly substituted for the sensor.

The term configuration server is to be understood broadly and also includes a combination of a plurality of servers.

The term generation code is to be understood broadly and includes any one-to-one mapping for defining electrical and/or mechanical features and/or the configuration parameters of the sensor and/or the twin sensor. In particular, the term generation code includes a variety of codes, which may in particular have different syntax.

According to one aspect, the one-to-one generation code for generating the twin sensor may be stored in a memory area of the sensor to read and transmit this value for generating the twin sensor to the configuration server and/or manufacturing server and/or the twin sensor.

According to one aspect, providing the generation code by the generation module may be performed in a plurality of steps, such as iteratively.

According to one aspect, it is suggested that the sensor and/or a configuration server which is configured to be signal-coupled to the sensor comprises the configuration module and, accordingly, the sensor or the configuration server provides the generation code.

When the configuration module is part of the configuration server, the sensor may be more simply engineered.

If the configuration module is part of the sensor, the overall system can be designed more simply.

According to one aspect, it is suggested that the configuration server is configured to be signal coupled to the sensor by way of the mobile terminal.

If the signal-coupling of the sensor to the configuration server is performed by way of the mobile terminal, a power consumption of the sensor for the transmission, in particular of the configuration parameters and/or the generation code to the configuration server, can advantageously be reduced, since the mobile terminal can be brought close to the sensor.

According to an aspect, it is suggested that a generation module, respectively the configuration module, is configured to be signal coupled to the twin sensor by way of an interface to transmit the generation code to the twin sensor.

Such an interface may be a wired interface or an interface that allows signals to be transmitted wirelessly to the twin sensor. In particular, the generation code can be transmitted to the twin sensor by way of the mobile terminal if the generation code has been transmitted from the generation module, respectively the configuration module, of the sensor and/or the configuration server to the mobile terminal.

Thereby, throughout this specification, the generation module may correspond to the configuration module.

According to an aspect, it is suggested that the generation module or configuration module, by way of the interface and by way of the mobile terminal, is configured to be signal coupled to the twin sensor for transmitting, based on the generation code, the configuration parameters to the twin sensor.

According to one aspect, it is suggested that the generation code is transmitted from the configuration server to the mobile terminal for transmission to the twin sensor for generation of the twin sensor.

For this purpose, in particular, the mobile terminal may be signal coupled to a configuration server for transmitting the configuration parameters of the sensor by way of the generation code from the configuration server to the twin sensor by way of the mobile terminal.

According to one aspect, it is suggested that, when configuring the sensor using the mobile terminal, an identification code of the sensor is transmitted from the sensor to the mobile terminal and the configuration parameters are transmitted to the sensor using the mobile terminal for a start-up of the sensor.

Advantageously, the identification code of the sensor can be used to take into account specific mechanical and/or electrical characteristics of the sensor when configuring the sensor. That is, in other words, the configuration of the sensor can be performed depending on the identification code.

According to one aspect, it is suggested that in addition to the configuration parameters, the identification code of the sensor is transmitted from the sensor to the configuration module or respectively the generation module to generate, based on the configuration parameters and the identification code, the generation code.

Advantageously, this allows specific mechanical and/or electrical features of the sensor to be taken into account during configuration.

According to one aspect, it is suggested that the generation code is transmitted from the mobile terminal to the twin sensor and the generation code is stored in a memory area of the sensor.

Advantageously, this may allow mechanical and/or electrical characteristics of the sensor, in addition to the configuration parameters, to be taken into account in a generation of the twin sensor.

According to an aspect, it is suggested that the generation code is transmitted from the generation module, or respectively the configuration module, of the sensor by way of the mobile terminal and/or the generation module, respectively the configuration module, of the configuration server to a manufacturing server for generating the twin sensor.

According to an aspect, the configuration server and the manufacturing server may be identical, i.e., a server may have both the functionality of the configuration server and the manufacturing server.

According to one aspect, it is suggested that, based on the generation code, a parts list for generating the twin sensor is created by way of the manufacturing server and/or the configuration parameters are transmitted to the twin sensor for generation.

Advantageously, electrical and/or mechanical characteristics of the twin sensor can be defined by way of the parts list.

According to an aspect, it is suggested that the respective signal-wise coupling is performed using a wireless communication method.

Advantageously, the wireless communication method can be used to easily establish a signal-wise connection.

According to an aspect, it is suggested that the respective wireless communication method comprises a Bluetooth method and/or a LoRa method.

According to an aspect, it is suggested that the configuration module of the sensor or the configuration module of the configuration server is configured and arranged to compare the identification code and/or the configuration parameters transmitted by the mobile terminal with corresponding entries in a configuration database, and to generate and provide a new generation code for the generation of the twin sensor if the identification code and/or the configuration parameters and/or a combination of identification code and configuration parameters are not present in the configuration database. Alternatively, if the identification code and/or the configuration parameters and/or the combination of identification code and configuration parameters are stored in the configuration database, the generation module, or respectively the configuration module, may provide a stored generation code for generating the twin sensor to provide a one-to-one generation code.

According to one aspect, it is suggested that the generation code is an alpha-numerical code, and in particular uniquely characterizes a type of the sensor and/or the configuration parameter of the sensor.

Thereby, the type of the sensor may characterize mechanical and electrical properties of the sensor.

Advantageously, the generation code can be manually checked for correctness, since it is an alphanumeric code, to allow easy troubleshooting, or at least to be able to perform parts of the method, as described, manually.

A sensor is suggested, which comprises an interface for signal-wise coupling of the sensor with a mobile terminal and a storage unit for storing configuration parameters.

Preferably, the sensor may comprise a generation module, respectively a configuration module. Thereby, the sensor, the interface, the storage unit and the generation module, respectively the configuration module, which is preferably present, is configured and set up according to one of the methods described above. That is, in other words, the sensor is configured and set up to be used for the method described above.

A mobile terminal is suggested with a processing unit and a wireless and/or wired transmission unit for signal-wise coupling of the processing unit with a sensor. Furthermore, the mobile terminal includes a wireless and/or wired transmission unit for signal-coupling of the processing unit to a configuration server and/or manufacturing server, and an interface unit signal-coupled to the processing unit for manual input and output of values to configure the sensor. Additionally, the processing unit is configured to perform the corresponding steps of one of the methods described above. That is, in other words, the mobile terminal is configured, constructed, or set up to be used for the above method.

A system for generating a twin sensor according to one of the methods described above is suggested, comprising:
    a configuration server having a configuration database and
        a configuration module for generating a one-to-one generation code;
    a manufacturing server for generating a parts list, and
    a mobile terminal as specified above.

Thereby, the configuration server and/or the manufacturing server includes a wireless and/or wired transmission unit for signal-wise coupling with a mobile terminal.

Whereby the system is configured to be coupled to the sensor and/or the twin sensor.

Advantageously, such a system can be used to generate in a simple manner an already configured twin sensor that can easily substitute a sensor, which had been configured during a start-up.

Use of the system described above to generate a twin sensor using one of the methods described above is suggested.

BRIEF DESCRIPTION OF THE DRAWINGS

Embodiments of the invention are shown with reference to FIG. 1 and are explained in more detail below. It shows:
    FIG. 1 a schematic sketch of a system for generating a twin sensor.

DETAILED DESCRIPTION

FIG. 1 schematically sketches a system for generating a twin sensor, the twin sensor being suitable for substituting a sensor that has been put into operation, for example, by way of configuration parameters. In this regard, the system includes a configuration server 130 having a configuration database 135 and a generation module, respectively configuration module, which is part of the configuration server 130, for generating a one-to-one generation code for inheriting configuration parameters that have been used to put the sensor 110 into operation, for example.

Furthermore, a manufacturing server 140 for generating a parts list 145 and a mobile terminal 120 are included in the system.

Thereby, the configuration server 130 and/or the manufacturing server 140 is configured to couple to a mobile terminal 120 by way of a wireless and/or wired signal-wise coupling. Such signal-wise coupling may be performed by way of an Internet connection 150 and/or a cloud 150 and respective local transmission methods to the servers that are coupled to the Internet and/or the cloud 150. For this purpose, a wireless transmission method 125 may be used to signal-couple the mobile terminal 120, in particular via the cloud 150, to the configuration server 130 and/or the manufacturing server 140.

In the method for generating a twin sensor for a sensor 110 by way of parameter inheritance, in one step a mobile terminal 120 is signal-coupled to the sensor 110. In a further step, the sensor 110 is configured by way of the mobile terminal 120, wherein the configuration is based on configuration parameters that are transmitted to the sensor 110 by way of the mobile terminal 120. This configuration may be done, for example, for a start-up of the sensor 110. In a further step, a unique and/or one-to-one generation code for inheriting the parameters to the twin sensor is generated by way of a configuration module, for example part of the configuration server, based on the configuration parameters.

In a further step, the generation code is provided by the configuration module, for generating the twin sensor by way of inheriting the parameters, where the inheriting of the parameters is based on the generation code.

In this regard, the configuration module of the configuration server 130 may compare the identification code and/or configuration parameters transmitted by the mobile terminal 120 by way of a transmission method 125, such as wireless, and by way of the cloud 150 with corresponding entries in the configuration database 135. The configuration server 130 generates a new generation code by way of the configuration module and provides it for generating the twin sensor, if the identification code and/or the configuration parameters and/or a combination of identification code and configuration parameters do not exist in the configuration database. However, if the identification code and/or the configuration parameters and/or the combination of identification code and configuration parameters are stored in the configuration database 135, the configuration server 130 provides a stored generation code for generating the twin sensor by way of a configuration module so that the generation code is one-to-one.

Alternatively, a generation code provided by the configuration module of the sensor 110 may be transmitted by the mobile terminal 120 via the cloud 150 to the manufacturing server 140, which uses it to generate a parts list 145 for generating the twin sensor and/or to inherit the configuration parameters of the sensor 110 to the twin sensor by transferring the configuration parameters of the sensor 110 to a memory of the twin sensor.

The invention claimed is:

1. A method for generating a twin sensor by parameter inheritance, the twin sensor being designed to be substituted for a sensor, comprising:
    coupling a mobile terminal to the sensor to transmit signals;
    configuring the sensor using the mobile terminal, wherein the configuring is based on configuration parameters transmitted to the sensor using the mobile terminal, when configuring the sensor by way of the mobile terminal, transmitting an identification code of the sensor from the sensor to the mobile terminal;
    generating a unique, one-to-one generation code for inheriting the configuration parameters by way of a configuration module, based on the configuration parameters and the identification code of the sensor;
    comparing, by the configuration module, the identification code and/or configuration parameters with corresponding entries in a configuration database, and generating and providing a new generation code for generating the twin sensor if the identification code and/or configuration parameters and/or a combination of identification code and configuration parameters do not exist in the configuration database, and providing a stored generation code for generating the twin sensor when the identification code and/or the configuration parameters and/or the combination of identification code and configuration parameters are stored in the configuration database to provide a one-to-one generation code;

and providing the generation code by the configuration module, for generating the twin sensor by way of inheritance of the parameters, wherein the inheritance of the parameters is based on the generation code, wherein the generation code is an alpha-numerical code and uniquely characterizes a type of the sensor and/or the configuration parameter of the sensor.

2. The method according to the claim 1, wherein the sensor and/or a configuration server, which is arranged and configured to be signal-coupled to the sensor, includes the configuration module, and correspondingly, the sensor or the configuration server provides the generation code.

3. The method according to claim 2, wherein the configuration server is arranged to be signal-coupled to the sensor by way of the mobile terminal.

4. The method according to claim 3, wherein the configuration module is configured to be signal-coupled to the twin sensor by way of an interface to transmit the generation code to the twin sensor.

5. The method according to claim 3, wherein when configuring the sensor by way of the mobile terminal, an identification code of the sensor is transmitted from the sensor to the mobile terminal, and wherein the configuration parameters are transmitted to the sensor by way of the mobile terminal for a start-up of the sensor.

6. The method according to claim 2, wherein the generation code is transmitted from the configuration module of the sensor by way of the mobile terminal and/or the configuration module of the configuration server to a manufacturing server for generating the twin sensor.

7. The method according to claim 6, wherein based on the generation code, a parts list is created by way of the manufacturing server for generating the twin sensor and/or the configuration parameters are transmitted to the twin sensor for generation.

8. The method according to claim 2, wherein the respective signal-wise coupling is performed by way of a wireless communication.

9. The method according to claim 2, wherein the method further comprises, by the configuration module of the sensor or of the configuration server, comparing the identification code and/or configuration parameters transmitted by the mobile terminal with corresponding entries in a configuration database; and generating and providing a new generation code for generating the twin sensor if the identification code and/or configuration parameters and/or a combination of identification code and configuration parameters do not exist in the configuration database; and providing a stored generation code for generating the twin sensor when the identification code and/or the configuration parameters and/or the combination of identification code and configuration parameters are stored in the configuration database to provide a one-to-one generation code.

10. The method according to claim 9, wherein the generation code is an alpha-numerical code and uniquely characterizes a type of the sensor and/or the configuration parameter of the sensor.

11. The method according to claim 2, wherein the configuration module is configured to be signal-coupled to the twin sensor by way of an interface to transmit the generation code to the twin sensor.

12. The method according to claim 2, wherein when configuring the sensor by way of the mobile terminal, an identification code of the sensor is transmitted from the sensor to the mobile terminal, and wherein the configuration parameters are transmitted to the sensor by way of the mobile terminal for a start-up of the sensor.

13. The method according to claim 1, wherein the configuration module is configured to be signal-coupled to the twin sensor by way of an interface to transmit the generation code to the twin sensor.

14. The method according to claim 13, wherein the configuration module, by way of the interface and by way of the mobile terminal, is arranged to be signal-coupled to the twin sensor to transmit, based on the generation code, the configuration parameters to the twin sensor.

15. The method according to claim 13, wherein when configuring the sensor by way of the mobile terminal, an identification code of the sensor is transmitted from the sensor to the mobile terminal, and wherein the configuration parameters are transmitted to the sensor by way of the mobile terminal for a start-up of the sensor.

16. The method according to claim 1, wherein when configuring the sensor by way of the mobile terminal, an identification code of the sensor is transmitted from the sensor to the mobile terminal, and wherein the configuration parameters are transmitted to the sensor by way of the mobile terminal for a start-up of the sensor.

17. The method according to claim 16, wherein, in addition to the configuration parameters, the identification code of the sensor is transmitted from the sensor to the configuration module to generate, based on the configuration parameters and the identification code, the generation code.

18. A sensor comprising:

an interface for signal-wise coupling with a mobile terminal; and a storage configured to store configuration parameters, wherein the sensor includes a configuration module, wherein the sensor is configured to be coupled to a mobile terminal to transmit signals, wherein the sensor is configured using the mobile terminal, wherein the configuring is based on configuration parameters transmitted to the sensor using the mobile terminal, wherein the sensor is configured to generate a one-to-one generation code for inheriting the configuration parameters by way of the configuration module, based on the configuration parameters, wherein the sensor is configured to provide the generation code, for generating a twin sensor by way of inheritance of the parameters, and wherein the inheritance of the parameters is based on the generation code.

19. A mobile terminal, comprising:

processing circuitry;

first wireless and/or wired transmission circuitry for signal-wise coupling of the processing circuitry to a sensor;

second wireless and/or wired transmission circuitry for signal-wise coupling of the processing circuitry to a configuration server and/or a manufacturing server; and interface circuitry signal-coupled to the processing circuitry for manual input and output of values and configured to configure the sensor, wherein the processing circuitry of the mobile terminal is configured to be coupled to the sensor to transmit signals and to configure the sensor, wherein the configuring is based on configuration parameters transmitted to the sensor, wherein the mobile terminal is configured to provide a one-to-one generation code provided by way of a configuration module of the sensor and/or by way of a configuration module of the configuration server for generating a twin sensor by way of inheritance of the parameters, and wherein the inheritance of the parameters is based on the generation code.

20. A system for generating a twin sensor, comprising:

a configuration server having a configuration database and a configuration module for generating a one-to-one generation code;

a manufacturing server for generating a parts list, wherein the configuration server and/or the manufacturing server comprises wireless and/or wired transmission circuitry for signal-wise coupling with a mobile terminal, wherein the mobile terminal including processing circuitry, first wireless and/or wired transmission circuitry for signal-wise coupling of the processing circuitry to a sensor, second wireless and/or wired transmission circuitry for signal-wise coupling of the processing circuitry to a configuration server and/or a manufacturing server, and interface circuitry signal-coupled to the processing circuitry for manual input and output of values and configured to configure the sensor, wherein the processing circuitry of the mobile terminal is configured to be coupled to the sensor to transmit signals and configured to configure the sensor, wherein the configuring is based on configuration parameters transmitted to the sensor using the mobile terminal, wherein a one-to-one generation code for inheriting the configuration parameters by way of a configuration module of the sensor and/or by way of a configuration module of the configuration server is generated based on the configuration parameters, and wherein the generation code is provided by the mobile terminal, for generating a twin sensor by way of inheritance of the parameters, wherein the inheritance of the parameters is based on the generation code.

* * * * *